United States Patent [19]
Palmer

[11] Patent Number: 5,456,424
[45] Date of Patent: * Oct. 10, 1995

[54] HIGH ALTITUDE LAUNCH PLATFORM PAYLOAD LAUNCHING APPARATUS AND METHOD

[75] Inventor: William R. Palmer, Melbourne, Fla.

[73] Assignee: Spread Spectrum, Melbourne, Fla.

[ * ] Notice: The portion of the term of this patent subsequent to Mar. 22, 2011 has been disclaimed.

[21] Appl. No.: 215,506

[22] Filed: Mar. 22, 1994

Related U.S. Application Data

[63] Continuation of Ser. No. 789,672, Nov. 8, 1991, Pat. No. 5,295,642.

[51] Int. Cl.⁶ ..................................................... B64G 1/14
[52] U.S. Cl. .............................. 244/2; 244/63; 244/172
[58] Field of Search ............................. 244/2, 63, 158 R, 244/172

[56] References Cited

U.S. PATENT DOCUMENTS

| | | | |
|---|---|---|---|
| 1,703,488 | 2/1929 | Junkers | 244/2 |
| 3,369,771 | 2/1968 | Walley et al. | 244/162 |
| 4,650,139 | 3/1987 | Taylor et al. | 244/135 A |
| 4,834,324 | 5/1989 | Criswell | 244/172 |
| 5,129,602 | 7/1992 | Leaward | 244/172 |

OTHER PUBLICATIONS

EPO 02640 30, Apr. 1988, Hardy et al.
Salkeld, "Single-Stage Shuttles for Ground Launch and Air Launch", Astronautics Aeronautic's Mar. 1994.
Peebles, "Airlaunched Shuttle Concepts", Brit Interplantary Soc, Apr. 1983 vol. 36 No. 4 pp. 153–155.

*Primary Examiner*—Galen L. Barefoot
*Attorney, Agent, or Firm*—Charles Wands

[57] ABSTRACT

A high altitude launch platform, used to launch a payload into earth orbit, is part of a payload launch system having a payload launching rocket with an engine carried by the high altitude launch platform. A first amount of fuel, substantially less than the capacity of the fuel tanks, is provided to the fuel tanks of the engines for the launch platform while the launch platform is on the ground. The launch platform is flown to a first altitude and the fuel tanks are provided with a second amount of fuel while the high altitude launch platform is at the first altitude. The addition of the second amount of fuel is sufficient to allow the payload to be launched into orbit.

22 Claims, 15 Drawing Sheets

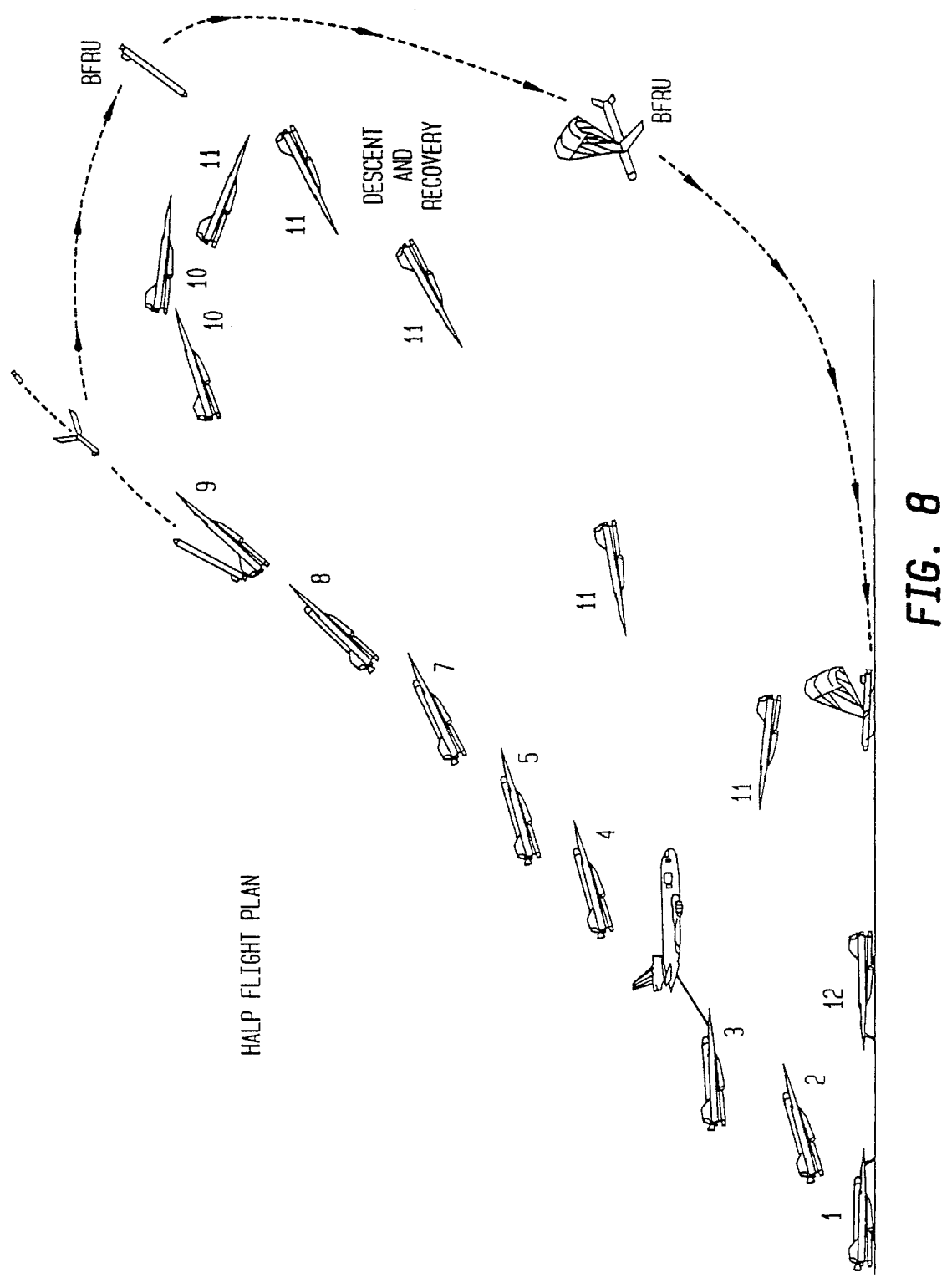

FLIGHT PLAN DESCRIPTION

| STAGES OF FLIGHT | 1 LIFT OFF | 2 CLIMB 1 | 3 FUELING | 4 CLIMB 2 | 5 BOOST 1 | 6 BOOST 2 |
|---|---|---|---|---|---|---|
| SPEED (MACH/MPH) | .23/145 | .46/290 | .43/270 | .78/490 | 1.6/1010 | 2.2/1390 |
| TOTAL WEIGHT (LBS) | 401,000 | 395,000 | 523,000 | 518,000 | 504,000 | 482,000 |
| HEIGHT (FEET) | 1200 | 32,000 | 32,000 | 48,000 | 75,000 | 85,000 |
| AIRFRAME FUEL (LBS) | 98,000 | 92,000 | 130,000 | 125,000 | 111,000 | 89,000 |
| EVENT TIME | 1 MIN | 10 MIN | 29 MIN | 5 MIN 24 SEC | 2 MIN 18 SEC | 13 SEC |

| STAGES OF FLIGHT | 7 BOOST 3 | 8 BOOST 4 | 9 LAUNCH | 10 COAST | 11 RETURN | 12 LANDING |
|---|---|---|---|---|---|---|
| SPEED (MACH/MPH) | 2.7/1700 | 3.3/2079 | 3.8/2142 | .95/600 | .72/454 | .27/170 |
| TOTAL WEIGHT (LBS) | 460,000 | 437,000 | 416,000 | 169,000 | 156,000 | 155,000 |
| HEIGHT (FEET) | 101,000 | 127,000 | 156,000 | 138,000 | 20,000 | 0 |
| AIRFRAME FUEL (LBS) | 67,000 | 45,000 | 23,000 | 21,000 | 8,000 | 6,000 |
| EVENT TIME | 12 SEC | 13 SEC | 12 SEC | 24 SEC | 16 MIN | 48 SEC |

FIG. 8A

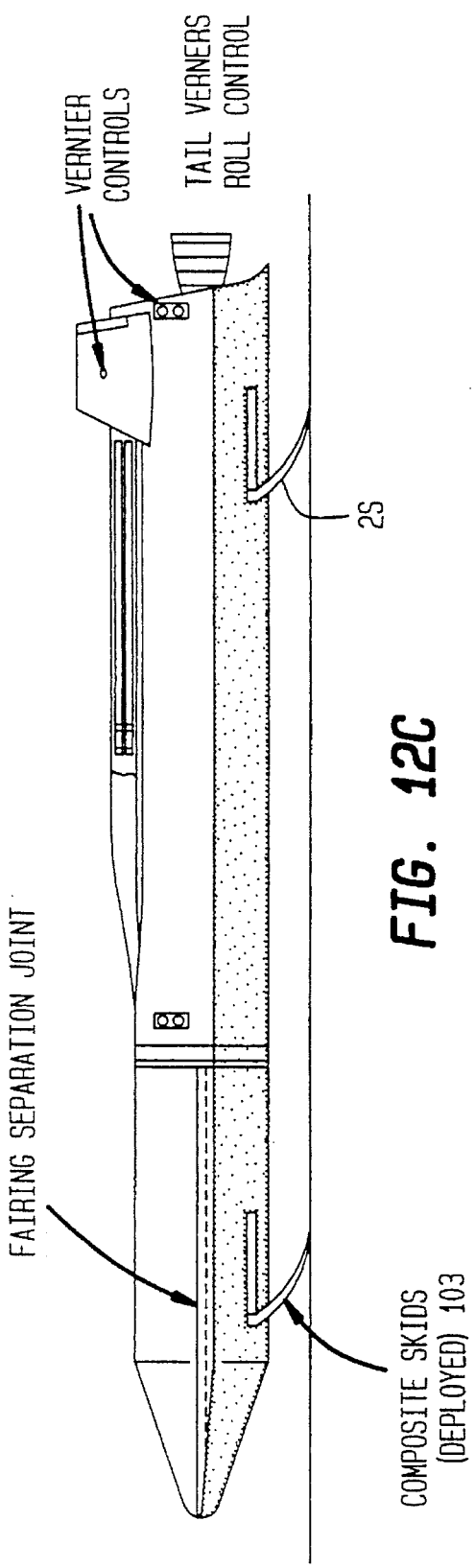
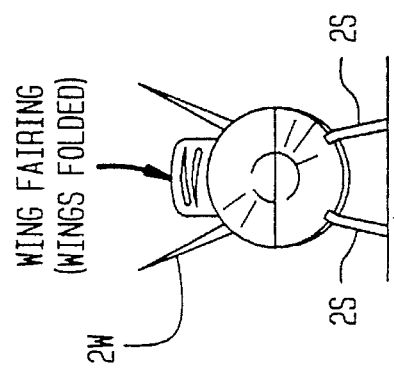
FIG. 12C
FIG. 12D

HIGH ALTITUDE LAUNCH PLATFORM PAYLOAD LAUNCHING APPARATUS AND METHOD

This is a continuation of application Ser. No. 07/789,672, filed Nov. 8, 1991, now U.S. Pat. No. 5,295,642, issued Mar. 22, 1994.

BACKGROUND AND SUMMARY OF THE INVENTION

The present invention is related to a launch system for launching a payload into earth orbit. More specifically, the present invention is directed at an improved payload launch system which will optimize the use of existing technology, minimize the cost of placing payloads into orbit and substantially increase the number of possible launchings with minimum hardware to thereby make feasible a more rapid and comprehensive commercialization of space.

Previously contemplated systems for launching payloads into earth orbit can be classified into three classes; rocket technology, hypersonic flight technology, and hybrid rocket/ airframe technology. Rocket technology, with rockets launching from the earth's surface, has to date been the primary technology used for launching payloads into earth orbit. The manned Mercury, Gemini, Apollo, and Space Shuttle programs all utilize such rocket technology. Such rocket technology also includes unmanned launch systems using Titan, Atlas, Delta, and other rocket assemblies. Hypersonic flight technology has been proposed, but not yet practically utilized, which would utilize an aircraft that would fly from the earth's surface directly into earth orbit and back to earth, utilizing a combination of air breathing jet engines and rocket engines. The so-called hybrid technology includes the B-52 launch of Pegasus rockets and other proposals such as the Sänger project, wherein an aircraft is used to lift a rocket to altitude, and then the rocket is launched from the aircraft.

Disadvantages of existing rocket technologies include (i) a high cost per pound of payload launched, especially for small and intermediate payloads up to 15,000 pounds; (ii) the consequent high investment risk factor due to the need to launch heavy payloads to reduce launch costs per pound of payload; (iii) the amount of hardware which is lost for each launch, including the requirement for rebuilding or repairing of earth surface launch pads subsequent to each launch; and (iv) the backlog in the time from launch request to delivery on orbit due to need for launch pad repairing and use of large multi-stage rocket propulsion systems.

Hypersonic flight technology launch systems have been contemplated, but not yet developed for practical use. Further, although such systems may be available some years in the future, there are many unanswered development questions which will likely require considerable expenditure of time and money to solve.

The hybrid technology which has been proposed, and to some extent utilized for example with the B-52/Pegasus system, is an attempt to combine flight dynamics with rocket dynamics. U.S. Pat. Nos. 4,265,416 and 4,802,639 disclose proposals for such hybrid technology launched systems.

The present invention is directed at providing an improved launch system utilizing hybrid technology which:

(a) improves cost effectiveness by maximizing hardware reuse;

(b) maximizes the payload to be launched by optimizing the use of multiple propulsion sources, including use of aerodynamic lift and air breathing propulsion in the atmospheric stages of launch mission and use of rocket technology only when air breathing propulsion systems become impractical because of the altitude;

(c) utilizes existing technology and hardware elements to the maximum extent;

(d) minimizes atmospheric pollution;

(e) is capable to support both large space platform construction programs and economical transportation for more routine intermediate payload telecommunications platforms;

(f) minimizes acoustic and vibration loadings on the payload during launch operations; and (g) provides multiple launch site flexibility and improved scheduling efficiency.

According to one aspect of the present invention, a system and a method of launching a payload into earth orbit is provided which utilizes an airframe capable of flight from the earth's surface to an upper atmospheric launch altitude and velocity, the airframe platform carrying a payload launching rocket. In order to optimize the payload carrying capacity of the airframe launch platform, the fuel tanks for the air breathing jet engines which propel the airframe from take-off to an initial altitude are intentionally only partially filled to facilitate this first stage of the mission. Once the launch platform reaches the first altitude, an air refueling operation takes place which replenishes the fuel used in reaching that altitude and fills the fuel tanks with that portion of the fuel which was not included at take-off, taking advantage of the improved load carrying capacity at refueling altitude and velocity as compared to the ground take-off lifting weight. Utilizing this approach, the present invention can accommodate a much heavier payload launching rocket/payload than would be the case with a full fuel load at take-off.

According to another aspect of the invention, a payload launching rocket carried to launch altitude by an airframe is fueled by a mixture of liquid oxygen (LOX) and hydrogen. To minimize the earth surface lift-off weight and frontal profile of the combined airframe and payload launching rocket, and consequently allow for efficient airframe designs to optimize launch velocity and altitude of the airframe at launch of the payload launching rocket, the LOX tanks are left empty or only partially filled on the ground. An airborne filling of the LOX tanks is then carried out once the airframe is airborne and flying at a mid-level atmospheric altitude of about 32,000 feet. Since the LOX is relatively inert and easy to handle, this at altitude transfer of LOX to the launching rocket will be relatively safe and efficient to perform, utilizing existing mid-air refueling techniques. The mid-level altitude filling of the LOX tanks will also minimize problems of frost build-up and ventilation problems that would be present at ground level, because of the 32,000 foot altitude temperature and air density are less likely to experience such problems. Embodiments are also contemplated for mid-air fueling of other liquid/gaseous rocket fuel for the airframe rockets and/or the payload launching rocket.

According to preferred embodiments of the invention, the intentional minimization of both jet engine fuel and rocket fuel for the payload launching rocket at earth surface take-off, followed by airborne fueling and fuel replenishment at the mid-level altitude, can be combined to minimize lift-off weight and optimize resultant velocity of the assembly at launch altitude to thereby maximize the payload that can be placed in orbit and minimize the energy (fuel) costs for a payload launch.

Preferred embodiments of the present invention use air breathing jet engines for propelling the launch platform from the earth surface to a first refueling altitude of about 32,000 feet. After refueling, during the next flight phase to an altitude of about 75,000 feet, the jet engines are supplemented by mid-plane rocket motors between about 48,000 feet to 75,000 feet at which time the jet engines are shut down. At about 80,000 feet the main airframe rocket engine assembly is actuated to propel the airframe to 156,000 feet and slightly higher. At about 156,000 feet the airframe has a velocity about Mach 3.8. At this point, the airframe will be at an optimum launch altitude and velocity in an atmospheric regime for optimum rocket engine performance, at which time the payload launching rocket is separated from the airframe to place the payload into low earth orbit at a speed of Mach 25. The airframe is then piloted back to earth, utilizing its air breathing turbojet propulsion once it returns to lower atmospheric altitudes. In especially preferred embodiments of the invention, it is necessary to only use a single stage rocket as the payload launching rocket.

According to another advantageous aspect of preferred embodiments of the present invention, the payload launching rocket is also reusable and includes aerodynamic guide surfaces and a parachute assembly to facilitate a return soft landing on earth. In certain preferred embodiments, the payload launching rocket is provided with movable wings which are concealed during launch and deployable for the return soft landing. In other embodiments, small fixed wings can be provided.

The present invention is optimally designed for use in launching intermediate size payloads between 8,000 and 15,000 pounds.

Since the launching system of the present invention operates primarily at altitudes above 30,000 feet, most severe weather systems can be avoided with most of the flight occurring in blue sky, thereby improving on the flexibility of the launch system with respect to weather. With the exception of weather conditions that would ground conventional passenger airliners, such as hurricanes or fierce blizzards, the system is capable of facilitating a successful launch. Thus, maintaining launch schedules will be much more feasible than are the current rocket launch from earth surface system.

Since the disclosed preferred embodiment of the system of the present invention includes topping off of the jet engine fuel and rocket fuel transfer to the payload launching rocket at an altitude of about 32,000 feet at about 300 miles per hour, the airframe flight dynamics are optimized. In especially preferred embodiments, it is proposed that a LOX rocket fuel and jet engine fuel transfer would occur adding approximately 135,000 pounds to the airframe system, thereby allowing the airframe to be as small in aerodynamic cross-section as possible at take-off to facilitate higher rocket launch point velocities. This reduction in airframe cross-section lift-off weight is especially advantageous in permitting an airframe design that can reach the high altitude and velocities to facilitate a single stage payload rocket to then place a large payload into earth orbit.

The present invention advantageously implements a flight plan which can be segregated into three distinct regimes. The first flight segment is the airframe flight regime. This is the region where air breathing propulsion and aerodynamic flight systems operate well. This segment is from sea level to about 80,000 feet. In the upper portion of this first segment, rocket propulsion is used to assist the air breathing jet engines. Above 80,000 feet, both aerodynamic control and air breathing engine performance are dramatically reduced. The second flight segment is the airframe boost regime. This zone is from about 80,000 feet to the launch altitude of about 156,000 feet. In this second segment, rocket propulsion is also used to propel the airframe. The rocket propulsion efficiency at this altitude is much better than at sea level and can be further optimized. The airframe aerodynamic control systems do not contribute much after 125,000 feet, but the overall effectiveness of the winged vehicle easily justifies its existence. The third final flight segment, the rocket-only regime, is above 156,000 feet. Here the airframe main rocket motors are operational where this is the most efficient mode for these motors. Preferred embodiments of the system are sized to carry a 12,000 pound payload into low earth orbit, allowing the airframe to return to its place of origin, landing like a normal aircraft.

According to another aspect of preferred embodiments of the present invention, the structural loading at the time of launch of the payload launching rocket are minimized as compared to current rocket launch systems. This structural loading placed on the payload during a normal ground based rocket launch results from acoustic loads and random vibration loads combined with the acceleration loads during roll over. With the launch system of the present invention, there is no rocket roll over from the vertical launch altitude to a more horizontal orbit placement altitude because the payload rocket launch is from the airframe which is already flying substantially horizontally. The payloads must always be designed taking into consideration these loads. Once the payload is on orbit, the payload hardware normally sees little or no load and thus a reduction in launch loads facilitates a more economical design of the payloads. With the present invention, the acoustic launch loads are lower than for earth surface rocket launch because the rocket motors are ignited far away from any reflective surface such as the earth's surface. This contrasts with current rocket launch systems where the sound waves are reflected back to the rocket at lift-off before the rocket is moving fast enough to escape the sound waves. These acoustic loads will be minimal with the present invention since the launch is carried out from a platform that is at an altitude with minimal atmosphere for transmitting acoustic loads.

Further, random vibrations will be reduced by the present invention due to the fact that the magnitude of the energy impulses will be small relative to an equivalent ground launched first stage where the load is typically highest. Also, roll over is the part of the flight when a ground launched rocket turns from a vertical direction to something closer to horizontal relative to the earth's surface. This maneuver can sometimes place high loads on the payload. Again the system of the present invention does not go from vertical to horizontal in an abrupt manner so this "roll over" load case does not exist.

Another advantageous aspect of the system and method of the present invention is the design of the arrangement for separating the payload launching rocket from the airframe. According to preferred embodiments of the present invention, the impulse of the airframe is matched with the impulse of payload launching rocket booster and payload assembly during launch separation for a smooth and controlled separation. It is contemplated by the invention that neither of the components rapidly accelerate away from one another, but simply separate, accelerating together to a point where the total separation is sufficient enough to allow the airframe rocket to be throttle back or shut off while the payload launching rocket assembly accelerates onto orbit. This separation arrangement minimizes rocket plume effects on from the payload launching rocket on the airframe and from the airframe rockets on the payload launching rocket assembly, thereby resulting in a very smooth separation sequence.

Other objects, advantages and novel features of the present invention will become apparent from the following detailed description of the invention when considered in conjunction with the accompanying drawings.

BRIEF DESCRIPTION OF THE DRAWINGS

FIG. 8 is a schematic pictorial representation of flight plan events, with accompanying table of FIG. 8A depicting various events during the utilization of the payload launch system of the present invention;

FIG. 12C is a side view of the booster flight return unit shown in a position landing on the earth's surface;

FIG. 12D is a sectional view of the unit of FIG. 12C; and

DETAILED DESCRIPTION OF THE DRAWINGS

Figure 1:
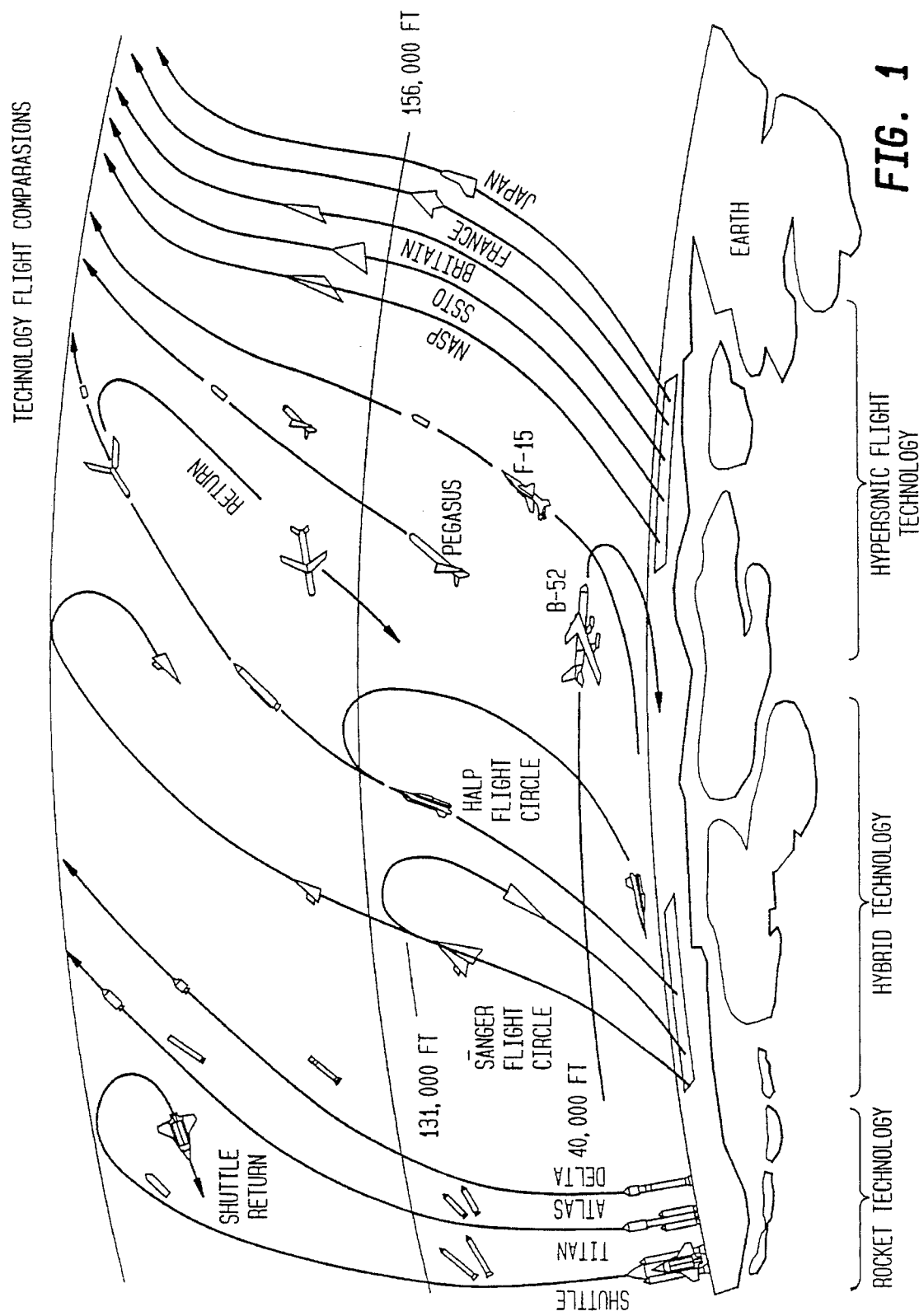
FIG. 1 is a schematic representation comparing various payload launch systems and methods with the launch system and method of the present invention.

FIG. 1 is a pictorial representation of different launch system technologies for launching payloads into earth orbit. At the left of FIG. 1, there are schematically depicted rocket systems which include multi-stage rockets for placing payloads into earth orbit. At the right of FIG. 1, there are schematic depictions of various hypersonic flight systems that have been proposed in the literature, all of which include an airframe vehicle which flies from the earth's surface into orbit and returns. These hypersonic flight technology systems are proposals only at this stage and presumably further expensive technology development will be required to bring these systems to the point where they can be realistically used on a commercial basis.

In the middle portion of FIG. 1, there are depictions of so-called "hybrid technology" which combines airplanes taking off from the earth's surface and carrying payload launching rocket assemblies that are then launched from these airplanes. The Pegasus/B-52 arrangement and the ASAT F-15 combination airplane/rocket launching systems have been utilized to place small payloads into low earth orbit. The Sänger project contemplates an airplane that would fly to an altitude of less than 150,000 feet at which time a rocket powered space plane would be launched for effecting flying into an earth orbit and later returned. An exemplary embodiment of the present invention is schematically depicted as the fifth launch system, viewed from left to right in FIG. 1, and designated with the acronym HALP (High Altitude Launch Platform system).

Figure 2A:
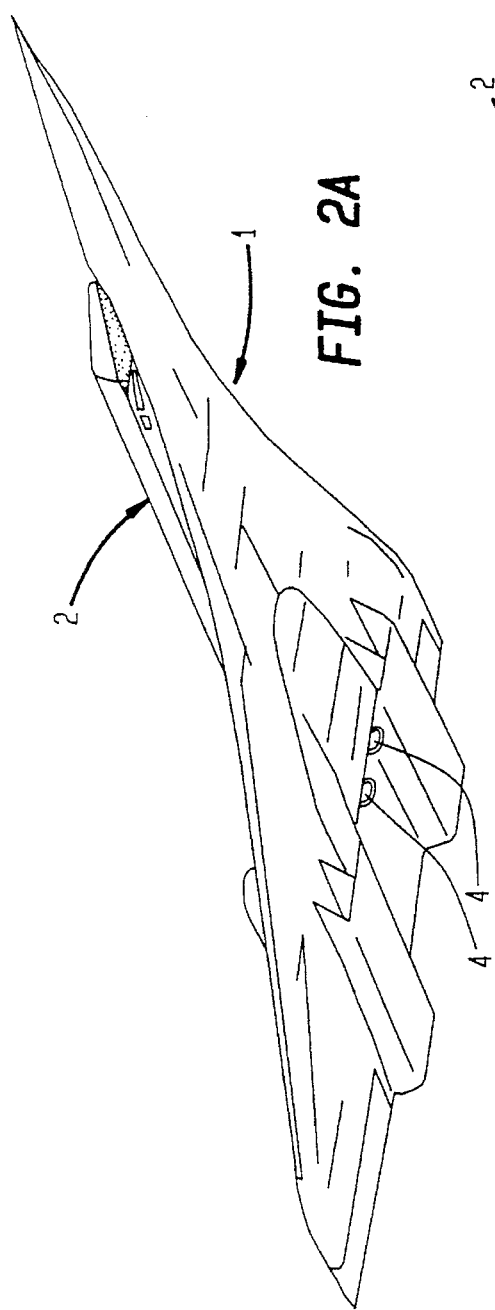
FIG. 2A is a schematic perspective bottom view of a launching platform airframe assembly constructed in accordance with a preferred embodiment of the present invention.
Figure 2:
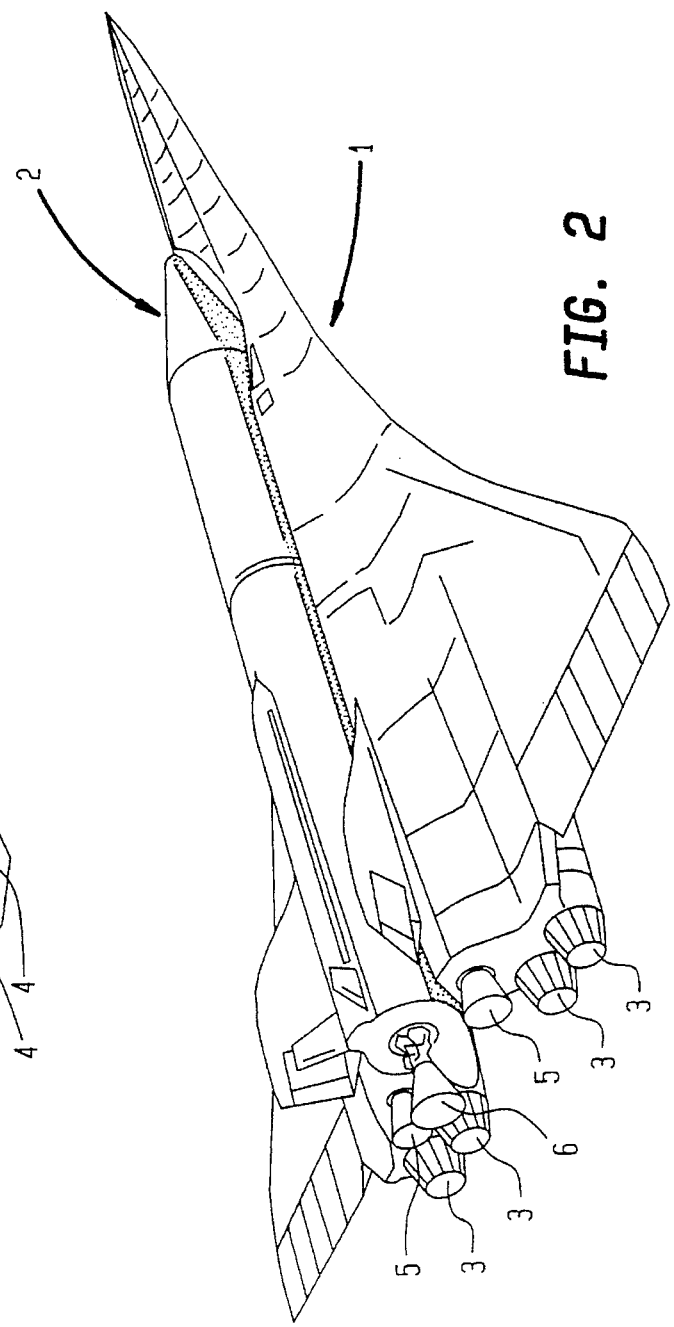
FIG. 2 is a schematic perspective top view of a launching platform airframe assembly constructed in accordance with a preferred embodiment of the present invention.

FIG. 2 schematically depicts a high altitude launch platform vehicle 1 carrying a payload launching rocket assembly 2. The SR-71 airplane could form a basic airframe to be modified as described herein to form the airframe. The airframe 1 includes four turbojet engines 3 for propelling the airframe from earth's surface to high atmospheric altitudes, as explained further below. The launch platform airframe 1 also includes a pair of mid-plane rockets 4 which operate to assist the jet engines 3 in propelling the airframe at intermediate high altitudes and speeds, as also described below in more detail. A further pair of main airframe rocket engines 5 are provided for propelling the airframe 1 during the highest altitude and velocity phase leading to launch of the assembly 2.

The airframe carries the payload launching rocket assembly 2, which includes a single stage rocket engine 6 for propelling the payload to orbit position and velocity, also as explained in more detail below.

Figure 3:
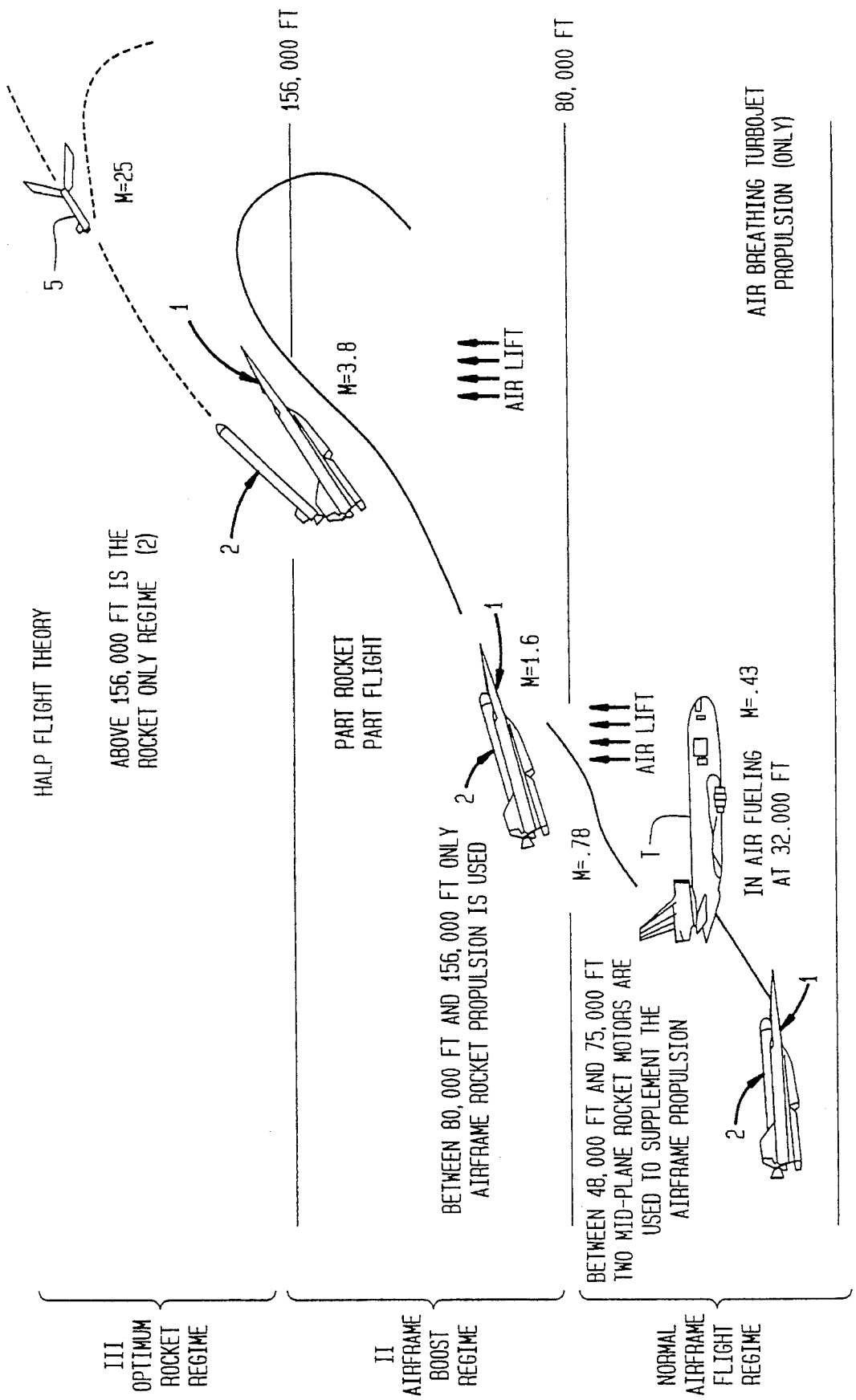
FIG. 3 is a schematic illustration depicting the flight segments for the launch system and method according to a preferred embodiment of the present invention.

FIG. 3 schematically depicts the flight theory involved in implementing the launch system and method of the present invention, with a flight segment I which is a normal airframe flight regime starting from take-off at the earth's surface and extending to an altitude of about 80,000 feet; a second flight segment II designated as the airframe boost regime wherein only airframe rocket propulsion is used and extending between 80,000 feet and the high altitude launch platform launch altitude of 156,000 feet; and flight segment III which is the launch of the payload launching rocket assembly from the airframe platform i to payload orbit at an altitude of about 200 miles.

In the first portion of the flight segment I, the airframe 1 is powered exclusively by the turbojet engines 3 from take-off to an altitude of 32,000 feet, where air refueling and filling of the LOX tanks for the rocket 6 takes place by way of fueling tanker T. After refueling and LOX tank filling at the fueling altitude of 32,000 feet, including replenishment of jet engine fuel used to reach that altitude and filling up of the jet engine fuel tanks which were intentionally left partially empty to maximize lift-off payload, the turbojet engines 3 propel the airframe i to an altitude of about 48,000 feet at which time the two mid-plane rocket motors 4 are used to supplement the propulsion by the jet engines 3 and propel the airframe 1 to a velocity of about Mach 1 and an altitude of about 80,000 feet. During the flight of the first flight segment I, the atmospheric air is used for supplying air to the air breathing turbojet propulsion engines 3 and for providing aerodynamic air lift to control the flight and gain altitude.

In flight segment II between 80,000 feet and 156,000 feet, only airframe rocket propulsion by main frame rocket motors 5 is used, with aerodynamic air lifting forces serving to facilitate control and increase in altitude. At the launch altitude of 156,000 feet, the airframe 1 is travelling at a velocity of M=3.8 and separation is then effected of the payload launching rocket assembly 2, which is driven by its single stage rocket engine 6 to an altitude of about 200 miles and a velocity of about Mach 25, at which time the payload P is released into orbit and the booster rocket flight recovery unit 2' is controlled so as to be returned to earth with a soft landing as described below.

Figure 4:
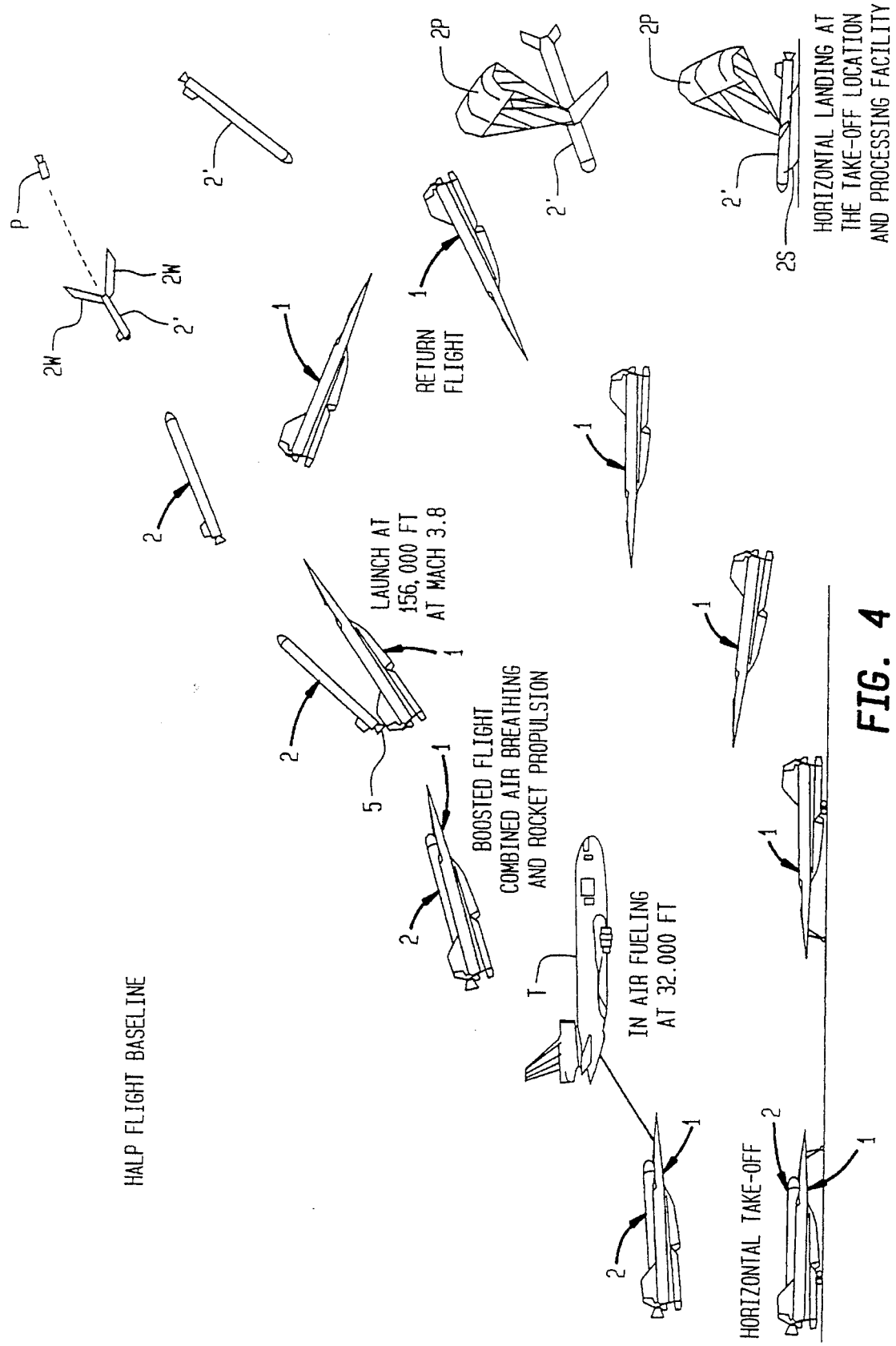
FIG. 4 is a schematic pictorial depiction of the flight base line for a preferred embodiment of the present invention.

FIG. 4 is a schematic illustration of the various stages of launch and airframe and rocket booster recovery operations. Proceeding in a clockwise manner from the lower left side of the drawing, the launch platform airframe 1 and payload launching rocket assembly 2 start with a horizontal take-off, reach the air fueling altitude of 32,000 feet where the replenishment of fuel used during take-off and the filling of the fuel tanks intentionally left partially empty is accomplished, along with filling of the LOX tanks on the payload launching rocket 6.

Subsequent to the air fueling operations, the airframe launch platform 1 and the attached payload launching rocket assembly 2 are lifted together to the launch altitude of 156,000 feet and velocity of Mach 3.8 by means of combined air breathing engines and rocket propulsion engines as described in conjunction with FIG. 3. At this launch altitude, the payload launching rocket assembly 2 is separated and the single stage rocket engine 6 propels the assembly 2 to an altitude and velocity where the payload P is placed into orbit.

Subsequent to separation, the air foil surfaces 2W of the booster flight recovery unit 2' are actuated to return the same for a soft landing. Alternatively, small fixed wings could be provided. A parachute 2P is deployed at low earth altitude to facilitate this soft landing on skids 2S. The launch platform airframe 1, after separation of the payload launching rocket assembly 2, is piloted back to earth with utilization of the turbo jet engines 3 at low altitudes to facilitate a soft airframe landing.

Figure 5:
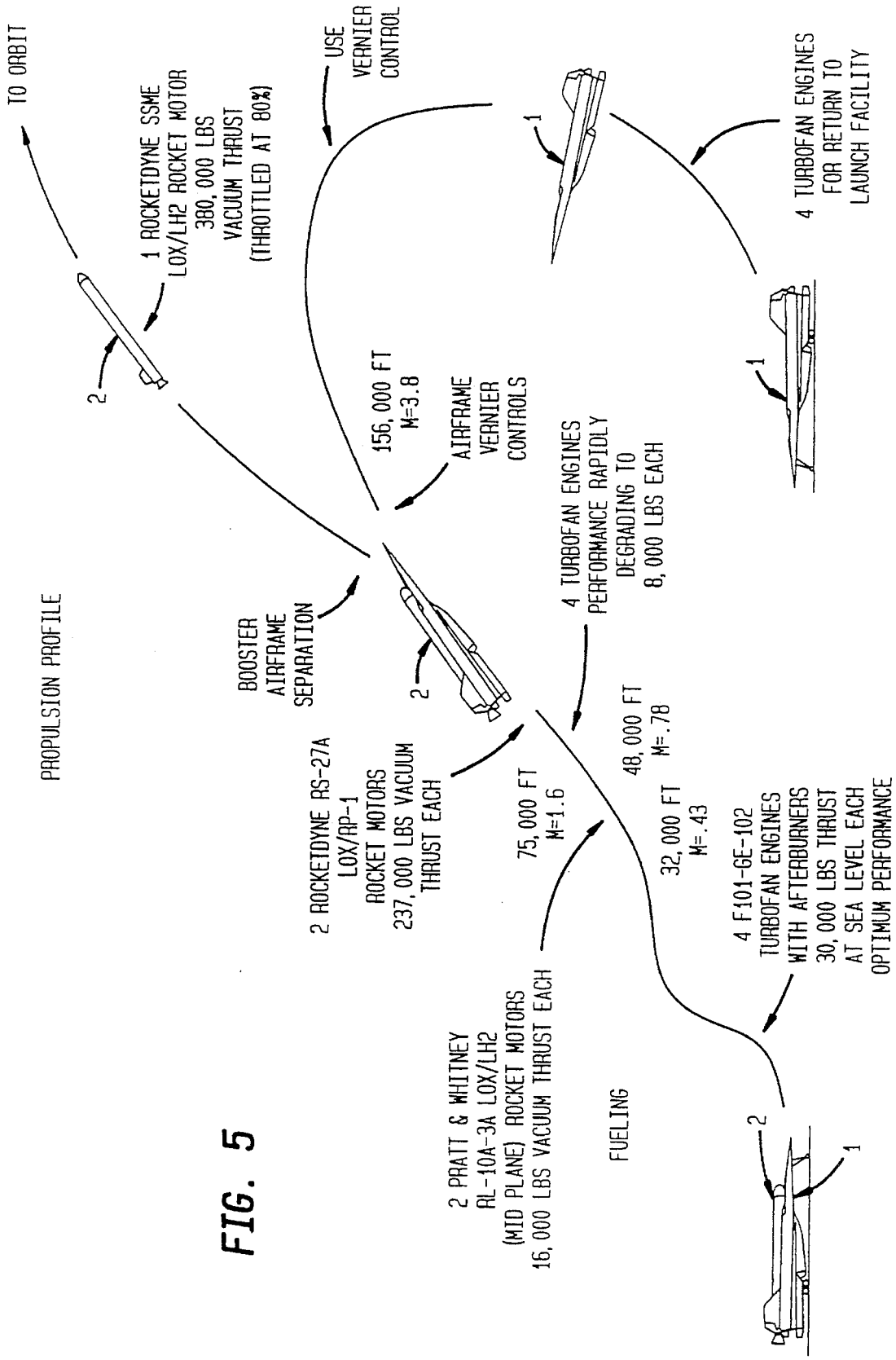
FIG. 5 is a pictorial schematic propulsion profile for a launch using a system and method according to a preferred embodiment of the present invention.

FIG. 5 is a schematic depiction of the propulsion profile for the launch system of a preferred embodiment of the present invention, including reference to specific existing jet engines and rocket motors that can be used to carry out the launch mission. As depicted in FIG. 5, the initial take-off and flight to fueling altitude of 32,000 feet is accomplished by four F101-GE102 turbo fan engines with afterburners and 30,000 pounds thrust at sea level each. These same engines, after the fueling operation, power the airframe 1 and payload launching rocket assembly 2 to an altitude of 48,000 feet at a velocity of Mach 0.78, at which time the mid-plane rocket engines 4, (two Pratt & Whitney RL-10A-3A LOX/LH2 rocket motors with 16,000 pounds vacuum thrust each) are actuated to assist the turbo fan engines 3 in propelling the system to an altitude of 75 to 80,000 feet and a velocity of Mach 1.6, at which time the turbo fan engine performance rapidly degrades due to the thinner atmosphere to 8,000 pounds each. At this stage, the main airframe rocket motors 5 are actuated and the jet engines 3 are shut down. These rocket motors 5 are two Rocketdyne RS-27A LOX/RP-1 rocket motors developing 237,000 pound vacuum thrust each for propelling the launching platform airframe and payload launching rocket assembly 2 to a launch altitude of 156,000 feet and velocity of Mach 3.8. During this stage of the flight, the airframe 1 is controlled by vernier control and limited airfoil control in the thin atmosphere. At the launch altitude, the rocket engine 6 of the payload launching rocket assembly 2 is actuated to propel the assembly 2 to an earth orbit for the payload P. Engine 6 is a single stage Rocketdyne SSME LOX/LH2 rocket motor developing 380,000 pounds vacuum thrust, similar to that used on the space shuttle.

Figure 6:
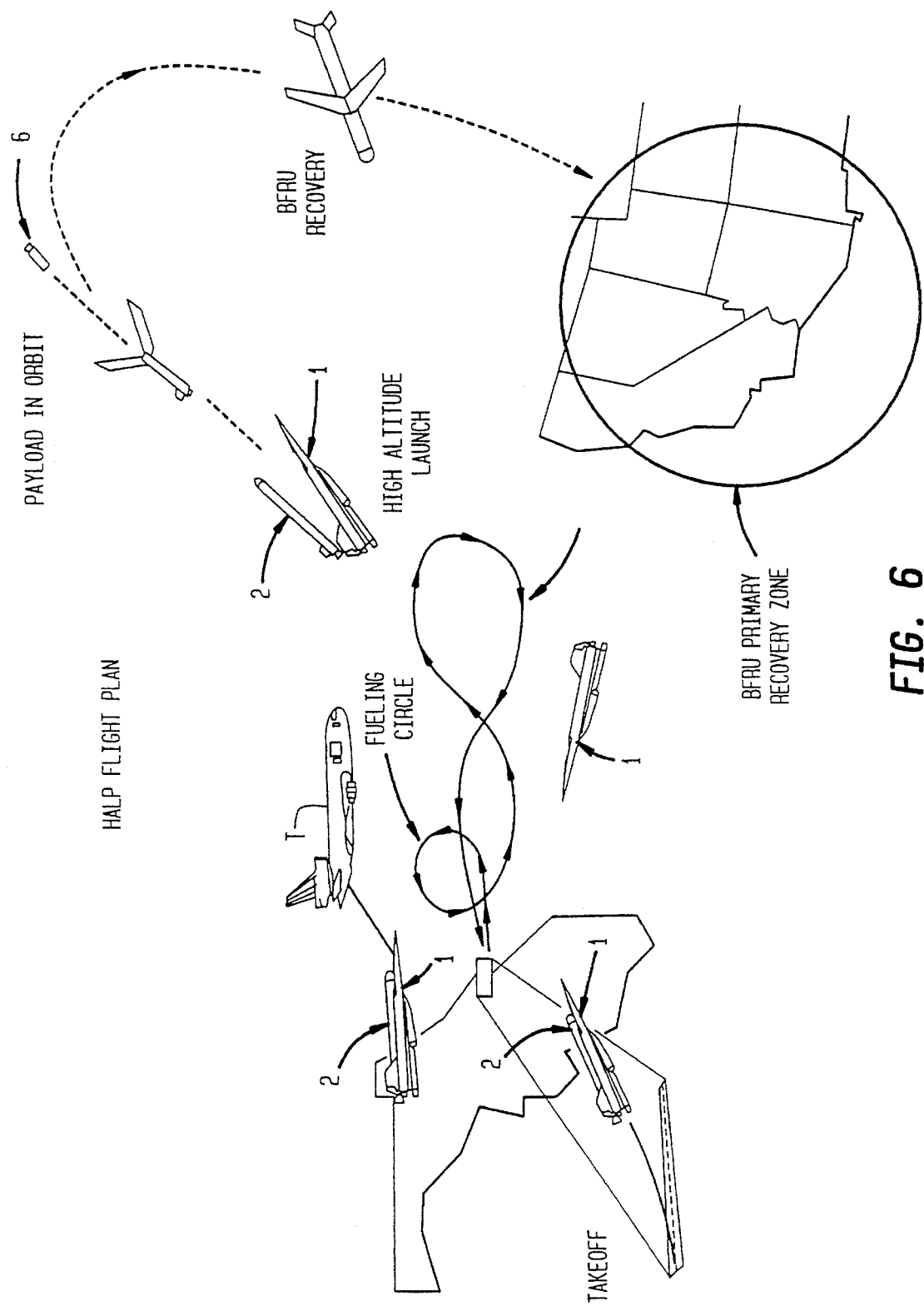
FIG. 6 is a schematic depiction of a flight plan for a payload launch system constructed according to a preferred embodiment of the present invention.

FIG. 6 schematically and pictorially depicts a mission flight plan for the payload launch system of the invention. This Figure shows a take-off and landing of the launch platform airframe 1 from California Andrews Air Force Base and recovery of the booster flight recovery unit (BFRU) 2' in the same region.

Figure 7:
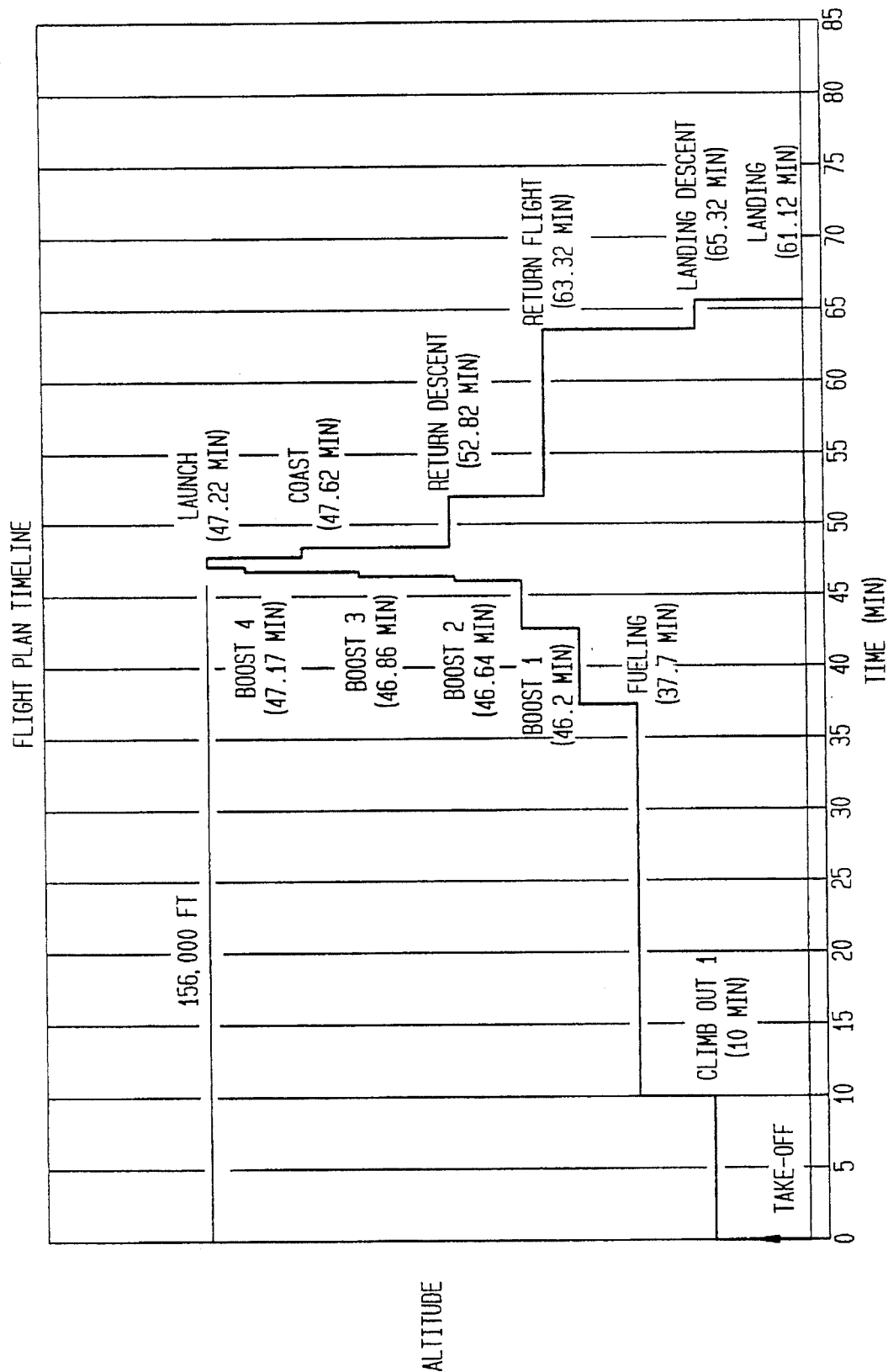
FIG. 7 is a flight plan time line for an exemplary embodiment of the present invention.

FIG. 7 is an exemplary flight plan time line for a launch with the system of the invention, from which it can be seen that the first climb out is completed in 10 minutes, the fueling is completed at the end of 37.7 minutes, the second climb out to the 48,000 foot level is completed at 42.6 minutes, the rocket boost 1 using the mid-plane rockets 4 and the turbojet engines 3 is completed at 46.2 minutes, the rocket boosts 2 and 3 using the main airframe rockets are completed respectfully at 46.64 minutes and 46.98 minutes, with the last airframe rocket boost stage 4 completed at 47.17 minutes and launch taking place at 47.22 minutes, with a coast down to the indicated altitudes as shown with the landing at 61.12 minutes.

FIGS. 8 and 8A graphically depict the 12-numbered stages of flight of the launch platform airframe 1, with the indicated speed, total weight, altitude, airframe fuel load, and event time for the respective stages.

Figure 9:
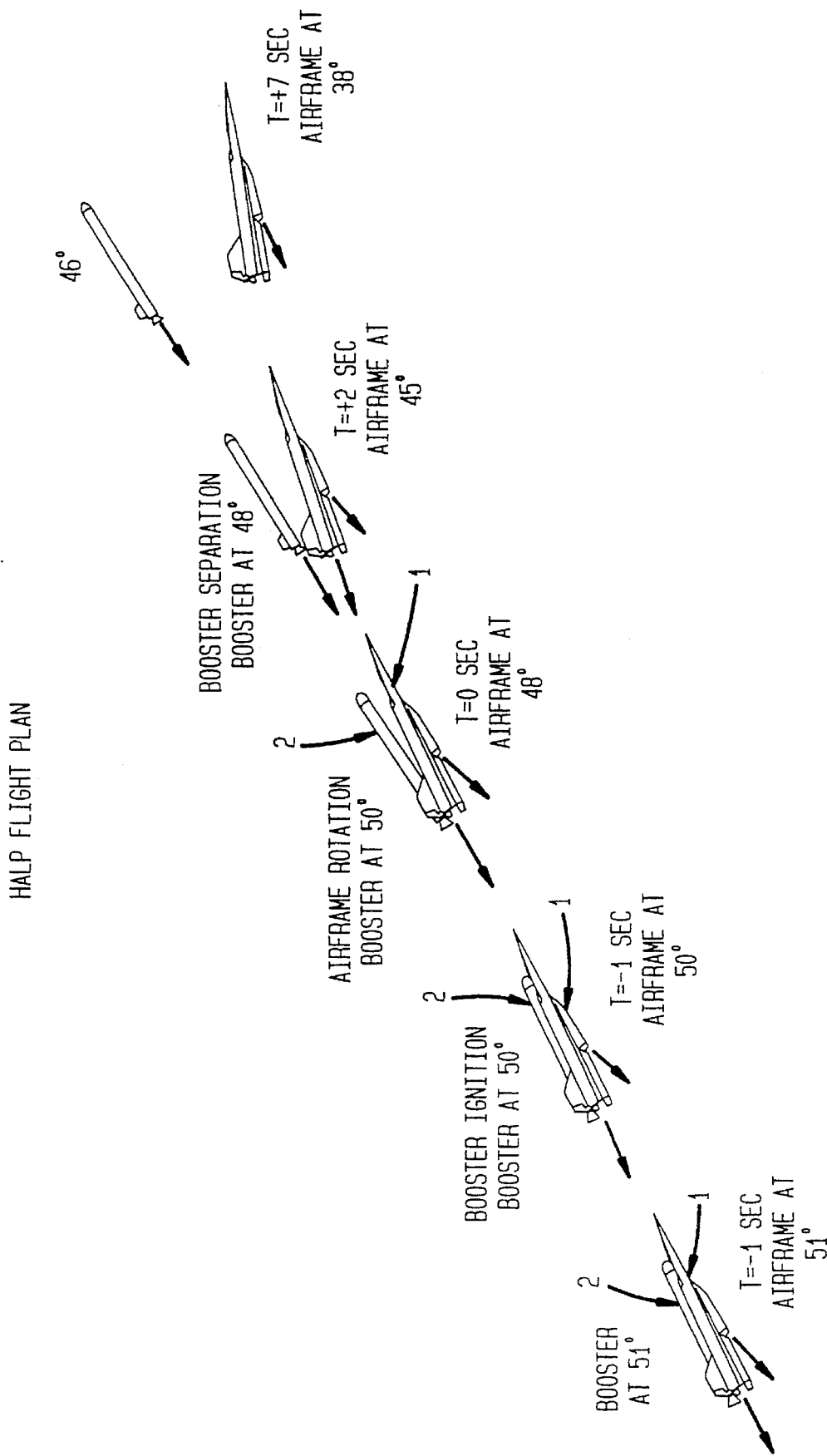
FIG. 9 is a schematic depiction of the release maneuver for the release of the payload launching rocket from the high altitude launch platform of preferred embodiments of the present invention.

FIG. 9 schematically depicts the release maneuver for the release of the payload launching rocket booster 2 from the launching platform airframe 1, from which it can be seen that the relative flight paths of the booster 2 and airframe 1 gradually divert so as to provide for a minimal structural loading at the time of launch of the payload launching rocket. A significant feature of this separation maneuver is that the airframe 1 and assembly 2 are provided with substantially similar impulses during and shortly after the separation so that the rocket plumes from the rockets 5 and 6 do not interfere with the respective other assembly.

Figure 10:
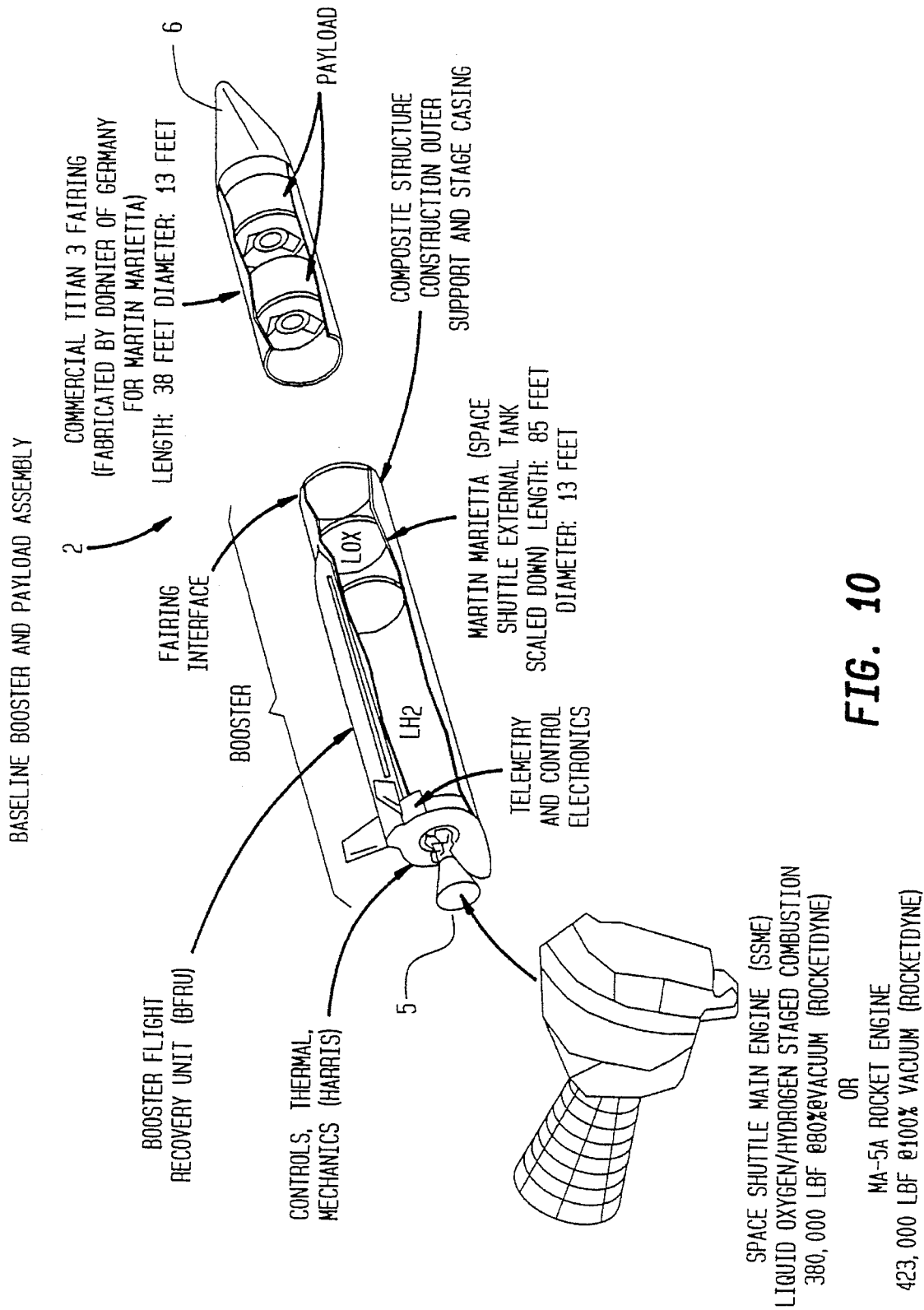
FIG. 10 is a schematic, partially broken away schematic illustration of a payload launching rocket and payload assembly for use with preferred embodiments of the present invention.

FIG. 10 is a schematic representation of the payload launching rocket assembly 2 which includes the payload P which is housed in a commercial Titan 3 fairing fabricated by Dornier of Germany for Martin Maretta, and having a length of 38 feet and a diameter of 13 feet. The payload bay volume is about 3200 cubic feet. The booster rocket 6 is composed of booster recovery unit 21 having an external tank configured similar to a scaled down version of the Martin Maretta space shuttle configuration and having a length of 85 feet and a diameter of 13 feet. The rocket engine 6 is a space shuttle main engine SSME liquid oxygen/hydrogen stage combustion engine of Rocketdyne having 380,000 pound thrust at 80% at vacuum, or alternatively an MA-5A Rocket engine having 423,000 pound thrust at a 100% vacuum from Rocketdyne. The telemetry and control electronic are those similar to those used in the space shuttle program. The payload P is placed in orbit from the cargo bay in a move similar to that used on the space shuttle.

Figure 11:
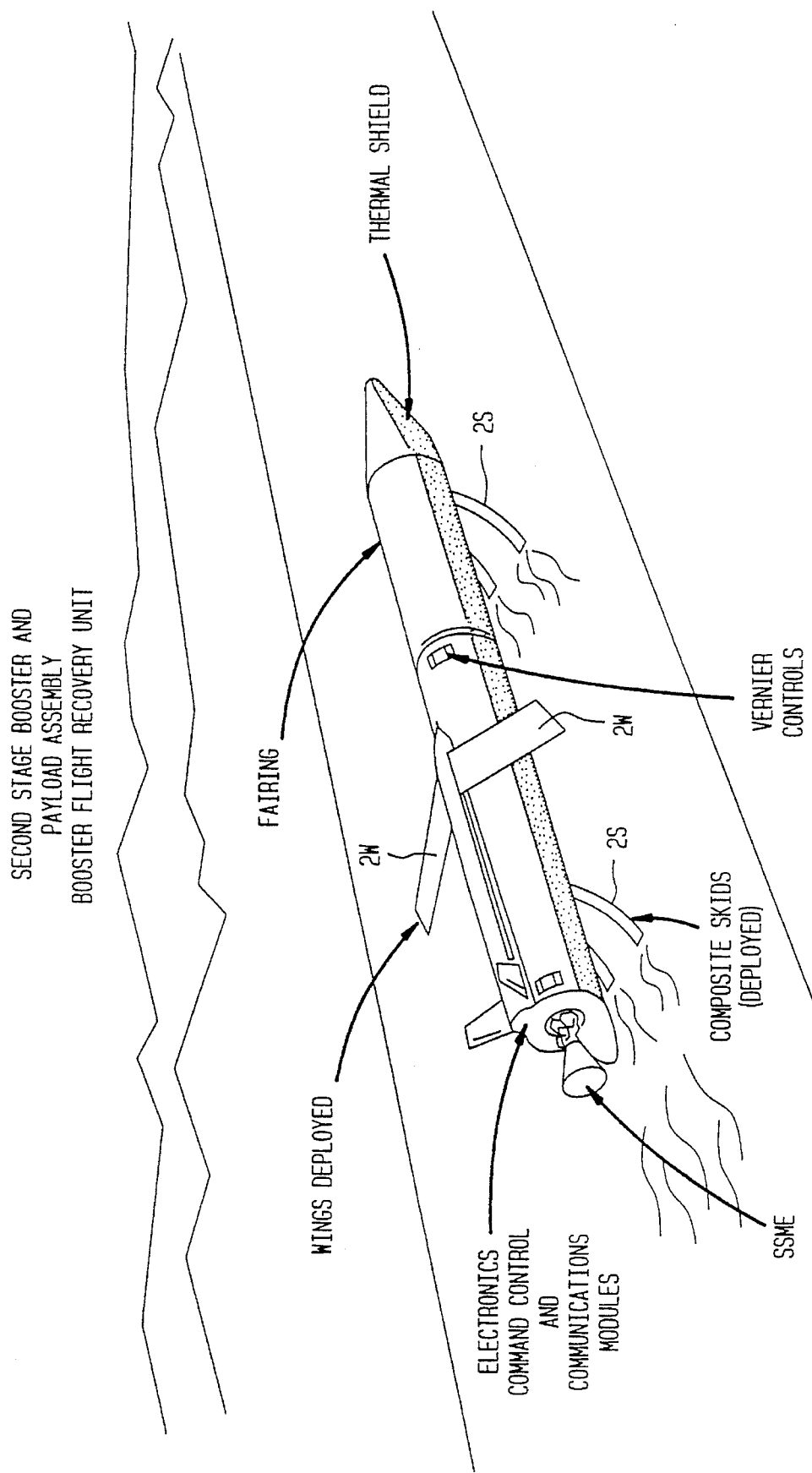
FIG. 11 is a schematic pictorial depiction of the payload launching rocket and payload assembly booster flight recovery unit constructed according to a preferred embodiment of the present invention.
Figure 12A:
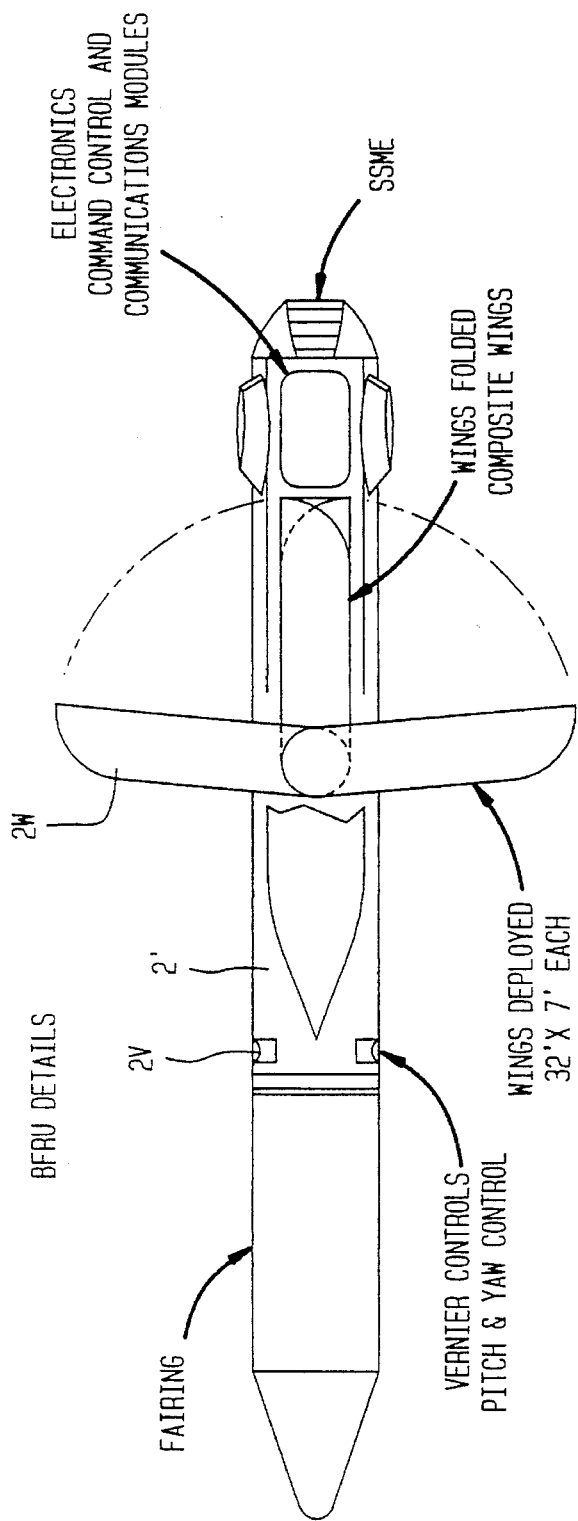
FIG. 12A is a top schematic view of the payload launching rocket, including depiction of features for accommodating booster flight return soft landing.
Figure 12B:
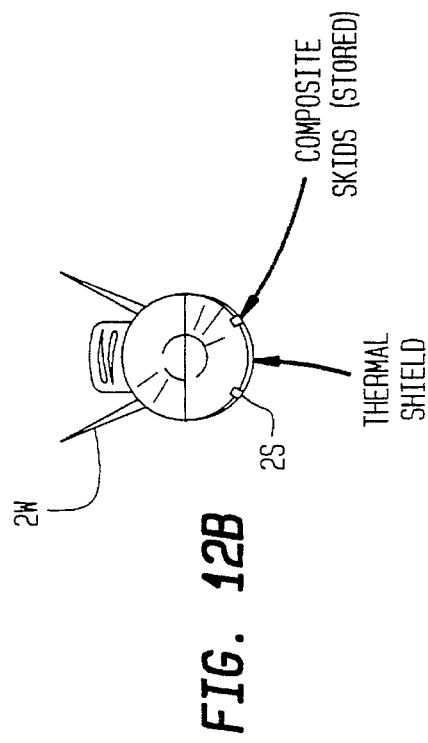
FIG. 12B is a sectional view of the unit of FIG. 12A showing the same in a return flight configuration.

FIG. 11 schematically depicts the payload launching rocket booster and payload assembly booster flight recovery unit. After separation of the payload P and insertion thereof into orbit, the booster flight recovery unit 2' is actuated with deployment of the wings 2W, operation of the vernier control 2V to guide the return through vacuum and thin atmospheric regions. Subsequently the composite skids 2S are deployed for forming the soft landing. The parachute is not shown in this FIG. 11, but is schematically depicted in FIG. 4.

FIGS. 12A–12D schematically depict the configuration of the booster flight recovery unit (BFRU) 2' with the deployable wings 2W and deployable skids 2S, as well as the vernier controls 2V.

Figure 13:
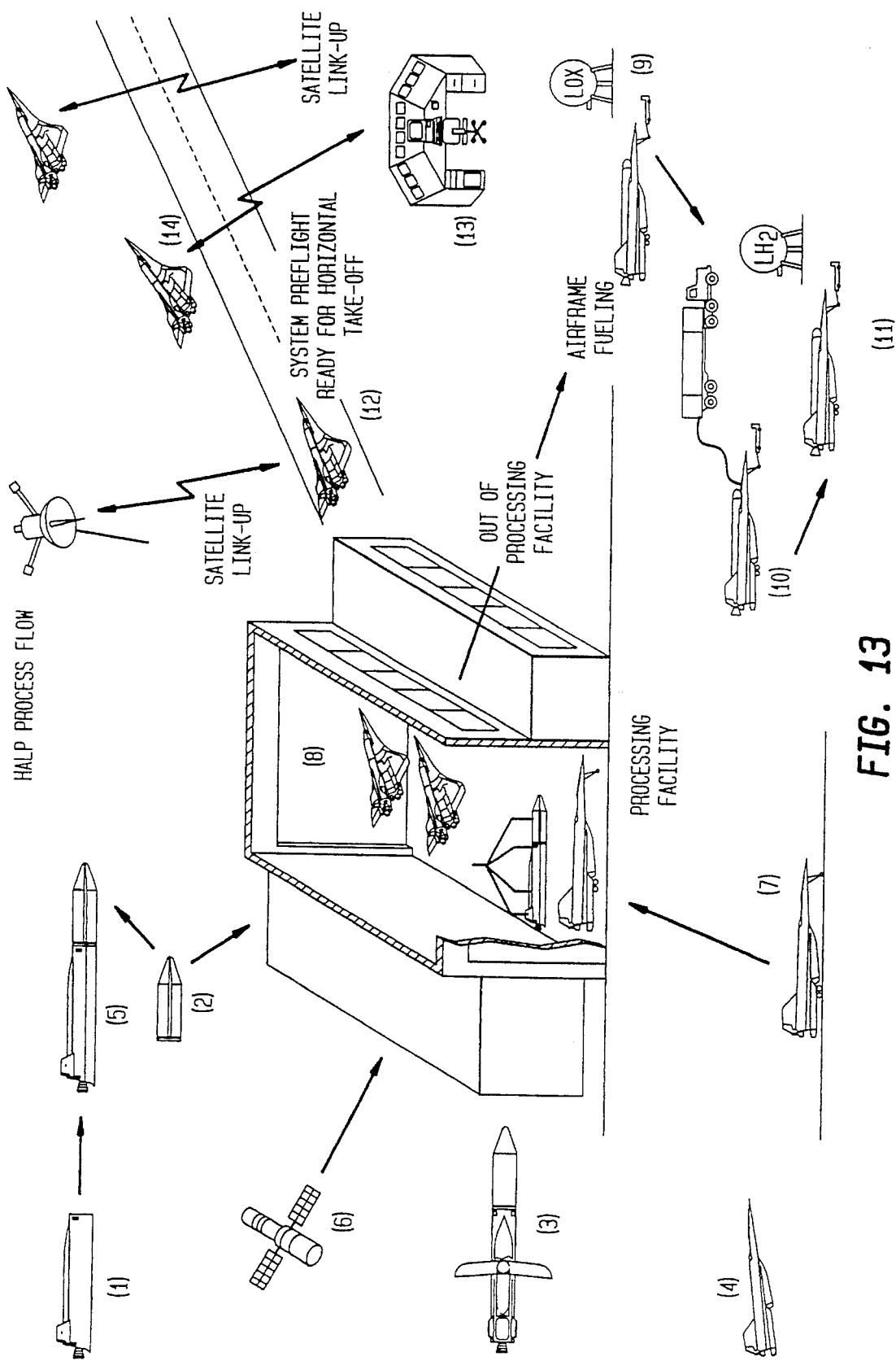
FIG. 13 is a schematic depiction of the sequencing process for repetitive payload launches using the payload launch system and method according to the present invention.

FIG. 13 pictorially depicts the processing of a payload launches using the system and method of the present invention. With the present invention and a total of four airframes, it should be feasible to conduct payload launches about every five days. The use of many existing hardware and software items should thus facilitate a very practical and economical commercial exploitation of space.

It is contemplated that the present invention, configured as described herein, will be able to launch payloads of up to 15,000 pounds and a volume of 3200+ cubic feet. The contemplated at launch velocities of the airframe 1 are between Mach 3.2 and 6.5. The contemplated launch altitudes are between 135,000 feet and 180,000 feet. The specific velocities and altitudes described in connection with the embodiments illustrated are not intended to limit the scope of the invention, but rather to depict exemplary preferred embodiments.

The specifically described system has presumed that the payload would be one or more unmanned objects. The present invention also contemplates embodiments for launching of manned spacecrafts.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of launching a payload into earth orbit, using a payload launch system including a payload propulsion vehicle having a payload propulsion vehicle engine carried by a high altitude launch platform employing at least one high altitude launch platform propulsion engine, comprising the steps of:

(a) preparing said high altitude launch platform for launch from the earth, such that the quantity of fuel available to power said payload propulsion vehicle engine is less than the total quantity of fuel required to place said payload into earth orbit;

(b) flying said high altitude launch platform from the earth to said first altitude above the earth; and (c) at said first altitude above the earth, supplying to said payload propulsion vehicle, from a propulsion fuel supply exclusive of said high altitude launch platform and said payload propulsion vehicle carried thereby, a further quantity of propulsion fuel that is sufficient to enable said payload propulsion vehicle engine to propel said payload propulsion vehicle to an altitude that places said payload into earth orbit.

2. A method according to claim 1, further comprising the steps of:

(d) propelling said high altitude launch platform and said payload propulsion vehicle from said first altitude to a second altitude higher than said first altitude; and (e) at said second altitude, causing separation of said payload propulsion vehicle relative to said high altitude launch platform and propelling said payload propulsion vehicle to a third altitude higher than said second altitude and which places said payload into earth orbit.

3. A method according to claim 2, wherein step (e) includes causing separation of said payload propulsion vehicle relative to said high altitude launch platform sufficient to minimize structural loading of said high altitude launch platform by an engine plume of said payload propulsion vehicle, and to minimize structural loading of said payload propulsion vehicle by an engine plume of said high altitude launch platform.

4. A method according to claim 2, wherein step (e) includes controlling the separation of said payload propulsion vehicle relative to said high altitude launch platform with a similar impulse relative to weight applied to each of said high altitude launch platform and said payload propulsion vehicle, until separation between said payload propulsion vehicle and said high altitude launch platform is sufficient to avoid structural loading of said payload propulsion vehicle by an engine plume of said high altitude launch platform, and to avoid structural loading of said high altitude launch platform by an engine plume of said payload propulsion vehicle.

5. A method according to claim 2, wherein step (e) includes controlling the attitude and acceleration of said payload propulsion vehicle relative to said high altitude launch platform with a similar impulse relative to weight applied to each of said high altitude launch platform and said payload propulsion vehicle, until separation between said payload propulsion vehicle and said high altitude launch platform is sufficient to avoid structural loading of said payload propulsion vehicle by an engine plume of said high altitude launch platform, and to avoid structural loading of said high altitude launch platform by an engine plume of said payload propulsion vehicle.

6. A method according to claim 1, wherein said at least one high altitude launch platform propulsion engine comprises an air-breathing engine, and wherein said high altitude launch platform employs air as a lifting medium to reach said first altitude.

7. A method according to claim 1, wherein step (c) comprises conducting an in-flight refueling of said high altitude launch platform and said payload propulsion vehicle at said first altitude from an in-flight refueling vehicle flying at said first altitude.

8. A method according to claim 1, wherein said at least one high altitude launch platform propulsion engine comprises an air-breathing engine.

9. A method according to claim 2, wherein said second altitude is between 135,000 and 180,000 feet.

10. A method according to claim 9, wherein said first altitude is above 25,000 feet.

11. A method according to claim 2, wherein step (d) comprises propelling said high altitude launch platform and said payload propulsion vehicle to a velocity in excess of Mach 3.2.

12. A method of launching a payload into earth orbit, using a payload launch system carried by a high altitude launch platform employing at least one high altitude launch platform propulsion engine, comprising the steps of:

(a) preparing said high altitude launch platform for launch from the earth, such that the quantity of fuel available to power said high altitude launch platform propulsion engine is less than the total quantity of fuel required to fly said high altitude launch platform to an altitude from which said payload may be placed into earth orbit;

(b) flying said high altitude launch platform from the earth to said first altitude above the earth; and (c) at said first altitude above the earth, supplying to said high altitude launch platform, from a propulsion fuel supply exclusive of said high altitude launch platform, a further quantity of propulsion fuel that is sufficient to enable said high altitude launch platform to fly to a second altitude, higher than said first altitude, from which said payload launch system places said payload into earth orbit.

13. A method according to claim 12, further comprising the steps of:

(d) propelling said high altitude launch platform and said payload launch system carried thereby from said first altitude to said second altitude higher than said first altitude; and (e) at said second altitude, causing separation of said payload launch system relative to said high altitude launch platform and causing said payload launch system to travel to a third altitude higher than said second altitude and place said payload into earth orbit.

14. A method according to claim 13, wherein step (e) includes causing separation of said payload launch system relative to said high altitude launch platform sufficient to minimize structural loading of said high altitude launch platform by an engine plume of said payload launch system, and to minimize structural loading of said payload launch system by an engine plume of said high altitude launch platform.

15. A method according to claim 13, wherein step (e) includes controlling the separation of said payload launch system relative to said high altitude launch platform with a similar impulse relative to weight applied to each of said high altitude launch platform and said payload launch system, until separation between said payload launch system and said high altitude launch platform is sufficient to avoid structural loading of said payload launch system by an engine plume of said high altitude launch platform, and to avoid structural loading of said high altitude launch platform by an engine plume of said payload launch system.

16. A method according to claim 12, wherein step (e) includes controlling the attitude and acceleration of said payload launch system relative to said high altitude launch platform with a similar impulse relative to weight applied to each of said high altitude launch platform and said payload launch system, until separation between said payload launch system and said high altitude launch platform is sufficient to avoid structural loading of said payload launch system by an engine plume of said high altitude launch platform, and to avoid structural loading of said high altitude launch platform by an engine plume of said payload launch system.

17. A method according to claim 12, wherein said at least one high altitude launch platform propulsion engine comprises an air-breathing engine, and wherein said high altitude launch platform employs air as a lifting medium to reach said first altitude.

18. A method according to claim 12, wherein step (c) comprises conducting an in-flight refueling of said high altitude launch platform and said payload launch system at said first altitude from an in-flight refueling vehicle flying at said first altitude.

19. A method according to claim 12, wherein said at least one high altitude launch platform propulsion engine comprises an air-breathing engine.

20. A method according to claim 12, wherein said second altitude is between 135,000 and 180,000 feet.

21. A method according to claim 20, wherein said first altitude is above 25,000 feet.

22. A method according to claim 12, wherein step (d) comprises propelling said high altitude launch platform and said payload launch system to a velocity in excess of Mach 3.2.

* * * * *